US012006649B1

(12) United States Patent
McMillan (10) Patent No.: US 12,006,649 B1
(45) Date of Patent: Jun. 11, 2024

(54) PIPE TAMPING VIBRATORY COMPACTING DEVICE

(71) Applicant: Schmidt Construction Company, Inc., Caldwell, ID (US)

(72) Inventor: Ryan McMillan, Emmett, ID (US)

(73) Assignee: Schmidt Construction Company, Inc., Caldwell, ID (US)

( * ) Notice: Subject to any disclaimer, the term of this patent is extended or adjusted under 35 U.S.C. 154(b) by 0 days.

(21) Appl. No.: 18/161,714

(22) Filed: Jan. 30, 2023

(51) Int. Cl.
*E02D 3/068* (2006.01)
*E02D 3/074* (2006.01)
*F16L 1/028* (2006.01)

(52) U.S. Cl.
CPC ............. *E02D 3/068* (2013.01); *E02D 3/074* (2013.01); *E02D 2300/0009* (2013.01); *F16L 1/028* (2013.01)

(58) Field of Classification Search
CPC .......... E02D 3/046; E02D 3/068; E02D 3/074
USPC ........................... 405/271; 404/133.05, 133.1
See application file for complete search history.

(56) References Cited

U.S. PATENT DOCUMENTS

| | | | | |
|---|---|---|---|---|
| 2,551,925 A | * | 5/1951 | Brown | E02D 3/046 173/52 |
| 3,534,669 A | * | 10/1970 | Judd | E02D 3/074 405/271 |
| 4,790,687 A | * | 12/1988 | Wright | E02F 5/12 37/367 |
| 5,261,762 A | * | 11/1993 | Yamaguchi | E02D 3/02 404/133.05 |
| 5,340,233 A | * | 8/1994 | Motl | E02D 3/02 104/14 |
| 5,911,544 A | * | 6/1999 | Mahony | E02D 17/12 405/271 |
| 6,418,644 B1 | * | 7/2002 | Bykov | E02F 3/967 405/179 |
| 6,419,420 B2 | * | 7/2002 | Hedlund | E01C 19/36 74/110 |
| 7,740,416 B2 | * | 6/2010 | Lesche | E01C 19/35 404/133.05 |
| 8,491,222 B2 | * | 7/2013 | Bonnemann | E01C 19/35 404/133.1 |
| 9,863,111 B2 | * | 1/2018 | Becker | E01C 19/38 |

FOREIGN PATENT DOCUMENTS

| | | | | | |
|---|---|---|---|---|---|
| CN | 115012389 A | * | 9/2022 | | |
| GB | 2606403 A | * | 11/2022 | ............ | E01C 19/34 |
| RU | 2249080 C2 | * | 3/2005 | | |

* cited by examiner

*Primary Examiner* — Frederick L Lagman
(74) *Attorney, Agent, or Firm* — Gravis Law, PLLC; Stephen S. Zimowski (57) ABSTRACT

The present invention provides a compacting shoe manufacture for attachment to the vibration system and assembly of a vibratory compacting machine, the compacting shoe including a contact plate with an arched contact surface sized and shaped to fit reasonably snugly around a portion of a pipe intended for underground installation, the compacting shoe also including at least two foot portions with a flat central section and first and second end sections provided at an angle relative thereto, the foot portions further including a durability sleeve preferably composed of an ultra-high-molecular-weight polyethylene material.

19 Claims, 11 Drawing Sheets

PIPE TAMPING VIBRATORY COMPACTING DEVICE

FIELD OF THE INVENTION

The present invention relates to mechanical products and designs in the construction industry. More specifically, the present invention relates to a mechanical device for use in laying underground piping, the device being designed to assist in complying with construction regulations and requirements regarding permitted settling distance for piping after installation.

BACKGROUND OF THE INVENTION

The use of underground piping is ubiquitous in construction projects in the U.S., whether preparing a work site for a structure, paving, or almost any other development project. Many State regulatory agencies impose restrictions and regulations upon underground pipe laying during construction, and the U.S. Department of Transportation even has a Pipeline and Hazardous Materials Safety Administration. Accordingly, complying with all applicable regulations often adds significant time and expense to many construction projects.

One of the more common practices in underground pipe laying is to dig the line, partially fill the line using gravel or other aggregate to create a bed for the piping, lay the pipe along the line on the bed, surround it with more gravel or other aggregate, and then complete the backfill of the line with the piping installed. The use of gravel or other aggregate creates a surrounding environment that ensures stability and longevity of the piping. It provides drainage so that water does not pool next to the piping or otherwise erode the surrounding space, assists with creating a drainage slope for the piping, where desired, and provides a back-up drainage medium for leakage, intentional or unintentional.

When laying pipe in this manner, best practice is to tamp the piping and burial site to ensure no significant settling occurs with the piping after installation. Indeed, amongst the regulations specific to underground pipe laying, many State regulatory bodies impose restrictions on the distance of "settling" after installation that may occur without digging up the piping and starting over. Construction workers are thus often required to install devices to measure and record any settling experience by such underground pipes over periods of time after installation, which operate to ensure compliance with such regulations.

As noted, if settling occurs beyond the distance permitted by regulation, the project manager is often forced to dig up the piping and start the pipe-laying portion of the project anew. This creates significant delays and costs for re-work, and construction crews accordingly have sought ways to prevent significant post-installation settling. Among commonly used methods are banging the piping down using manual tools, such as hammers and the like, using electrical or gas-powered mechanical devices, such as tamping machines, to encourage the piping to settle before installation is complete, or manually banging on the piping using hands and fists. As those in the industry know, these methods are time consuming, labor intensive, and often ineffective.

In particular, the use of classic tamping machines has proven insufficient for these purposes. Such devices are designed to grade and flatten surfaces, and they accordingly employ a flat ground-contacting base that vibrates and is maneuvered by the user along the surface to be flattened.

The flat base has proven wholly ineffectual for the purpose of tamping piping after it has been laid for several reasons.

First, the primary function of the flat base on such devices is to flatten the surface it is contacting. This means using it directly on the piping, which is typically cylindrical with a circular or at least curved cross section, can often result in flattening or deforming the pipe, a particularly undesirable outcome. If, instead, the piping is covered first, the tamping machine becomes less effective at ensuring no significant post-installation settling will occur.

Second, the flat base is also difficult to maneuver along a curved surface, and so it is easy to lose control of the tamping machine when trying to apply its function directly to the piping. Notably, these activities are often performed in dug ditches and the like, where space to maneuver is lacking and moving a heavy mechanical device, such as a tamping machine, as intended often proves difficult. The direction of vibration from the tamping machine is thus often misdirected, negatively affecting its effectiveness for this purpose.

Third, because of the disconnect between the curved surface of a pipe and the flat surface of a tamping machine's flat base, and because they are heavy and cumbersome, it is easy to lose control of such a device and have it fall to one side or the other of the piping. Again noting that these activities are often undertaken in a relatively small space, such as a dug ditch, it can be very difficult to recover a tamping machine when and if this occurs, and may even require the introduction of additional heave machinery to do so, delaying the project and increasing costs.

Fourth, the classic use of the tamping machine is to slowly move it in a single direction, flattening the surface as it progresses. When applying the tamping function to laid piping, it is often desirable to back up to go over particularly problematic or concerning locations along the piping's length, such as transition points and the like. This is made difficult by the classic tamping machine's construction, which encourages it to continue to proceed in one direction.

Despite these drawbacks and given the lack of effective alternatives beyond stomping on the pipe by foot and other slow, ineffective, and potentially dangerous methods, the tamping machine is still the most commonly used device for these purposes.

Accordingly, there remains a need in the construction industry, and specifically on the underground pipe laying aspect of construction projects, for a device and method for ensuring compliance with regulatory requirements regarding post-installation settling of underground pipes. A device and/or method are needed that can operated to encourage piping to settle before the installation process has been completed and that are quick, easy, and effective.

SUMMARY OF THE INVENTION

It is therefore an object of the present invention to provide a device for managing the process of encouraging laid piping to settle before installation is completed. It is another object of the present invention to provide such a device that is easy to maneuver and apply to a curved surface. It is also an object of the present invention to provide such a device that is capable of easy movement in at least two substantially opposing directions and that such device be usable on various sizes of piping with varying diameters and circumferences.

The present invention thus provides a removable arched compacting shoe connectable to a vibratory compacting machine and a vibratory compacting machine including one or more removeable and interchangeable arched compacting shoes. The compacting shoes are designed and oriented to surround at least an upper portion of a cylindrical or otherwise curved surface pipe with a substantially circular, semicircular, or similar cross-sectional shape.

The compacting shoes preferably include a connection portion for attachment to the vibrating system and assembly of the vibratory compacting machine. The connection portion includes one or more apertures arranged to align with similar connection features on the vibrating system and assembly of the vibratory compacting machine and are sized to receive a bolt or other attachment mechanism.

The compacting shoes also preferably include a contact plate with an arched contact surface affixed to the connection portion. The arched contact surface is sized and shaped to fit reasonably snugly around a portion of the outer circumference of piping intended for underground installation. The arched contact surface thus facilitates sliding the vibrating compacting machine along the length of laid piping during use.

The compacting shoes further preferably include two or more foot portions affixed to the contact plate. The foot portions preferably have a flat, central section and first and second end sections provided at an angle relative to the central section. This design and arrangement facilitate maneuvering the vibrating compacting machine equipped with the compacting shoes along pipes, the ground, etc. and avoid hang-ups or snares due to uneven surfaces.

Each of the two or more foot portions also preferably employs a durability sleeve removably attached to the bottom of each foot portion, using bolts or other know mechanical attachment techniques. The durability sleeves are preferably composed of plastic material, and more preferably of an ultra-high-molecular-weight polyethylene material. In some embodiments, certain parts and features of the two or more foot portions preferably operate to form at least a portion of the arched contact surface.

The compacting shoes are preferably easy to attach and remove, as are the durability sleeves, which provides versatility of use on varying pipe sizes during a project. Preferable embodiments of the present invention include various compacting shoes sized to fit the most commonly used pipe sizes for underground projects, including without limitation pipes with a nominal bore diameter of anywhere in the range of 4-16 inches and even as large as 36 inches in some preferable applications.

Some preferable embodiments of the contact plate of the compactor shoes are formed by two or more bridge structures with arched lower edges that operate as at least a portion of the arched contact surface. The bridge structures further preferably have leading and trailing surfaces, and in some preferable embodiments the outermost of such leading and trailing surfaces include substantially flat, vertical protrusions that extend upwardly and away from the arched lower edges. Such vertical protrusions preferably extend above the connection portion and help to shield the connection portion, the connection mechanism, and the lower end of the vibrating system and assembly of the vibratory compacting machine from dirt, debris, and the like during operation.

The vibratory compacting machine employing the compacting shoes of the present invention include the vibration system and assembly, which is preferably encapsulated using bellows or the like to keep it clean and operational, a drive engine for activating the vibration system, air, fuel, and oil filtration systems and filters, and the like. Preferable embodiments also include at least first and second handle compositions, the first being located and oriented to facilitate operation of the vibratory compacting machine in a first direction, the second being located and oriented to facilitate operation of the vibratory compacting machine in a second direction substantially opposite to the first direction. An additional central lifting handle or guide may also be included, in some preferable embodiments, to assist in lifting the vibratory compacting machine out of a hole, ditch, or the like.

The vibratory compacting machine according to the present invention is thus operable to run along laid piping and tamp it down to its natural settling point during the pipe installation process. The machine can be run back and forth in opposite directions along the pipe easily and conveniently and can smoothly transfer over and across transition points and other obstructions, ensuring the piping will not settle significantly after installation in violation of local rules and regulations.

As those of skill in the art will appreciate, the present invention is not limited to the embodiments and arrangements described above. Other objects of the present invention and its particular features, arrangements, and advantages will become more apparent from consideration of the following brief description of the drawings and detailed description of the invention.

DETAILED DESCRIPTION OF THE INVENTION

The following detailed description illustrates and describes the present invention by way of example, not by way of limitation of the principles of the invention. This description will enable one skilled in the art to make and use the invention and describes several embodiments, features, arrangements, adaptations, variations, alternatives, and uses of the invention, including what is presently believed to be the best mode of carrying out the invention. Those of skill in the art will appreciate other variations and arrangements possible without straying beyond the principles of the invention, and the present invention is not limited to those embodiments and arrangements described hereafter.

The figures depict exemplary embodiments of a vibratory compacting machine 10 with a compacting shoe 12 according to preferable embodiments of the present invention. The compacting shoe 12 includes a connection feature 14 that can be removeably attached to the vibration system and assembly 36 using known connection mechanisms, such as the bolts 34. Preferable embodiments of the connection portion 14 include one or more bores or apertures arranged to align with like features on the vibration system and assembly 36 to facilitate the connection. The vibration system and assembly 36 is often encapsulated by known features and methods, such as bellows 38 or the like, to keep the components free of dust, dirt, and debris that is kicked up when the vibratory compacting machine 10 is in use.

The connection feature 14 of the compacting shoe 12 is preferably affixed to the contact plate feature 16, which includes an arched contact surface 18 designed to fit around at least a portion of a substantially cylindrical item with a substantially circular cross-section, such as a pipe. The arched contact surface 18 of the contact plate 16 helps to avoid slippage when the vibratory compacting machine 10 is in use on piping or other curved surfaces. The vibration from and weight of the vibratory compacting machine 10 encourages laid piping to settle down into place in the installation site, with the goal of avoiding significant additional settling once the underground pipe installation is complete.

The arched contact surface 18 is preferably sized to fit one of several standard sized pipes commonly used for underground piping projects. As will be known to those of skill in the art, such piping typically has a nominal bore diameter somewhere between 2 and 36 inches. Embodiments of the present invention are available for all such pipe sizes, and the compacting shoes 12 are removeable to provide the present invention with versatility of use on numerous pipe sizes at a job site, when necessary. For example, embodiments of the vibratory compacting machine 10 of the present invention may include three compacting shoes 12 with arched contact surfaces 18 sized and shaped to fit 6 inch piping, 12 inch piping, and 16 inch piping. A fourth compacting shoe 12 could also be included with an arched contact surface 18 sized and shaped to fit up to 36 inch piping or even larger in some preferable applications. Those of skill in the art will understand that the present invention is not limited to any size or size range of piping or any number of compacting shoes 12, and compacting shoes 12 useable on any size piping fall within the scope of the present invention.

The compacting shoe 12 also preferably includes two or more foot portions 20 affixed to the contact plate 16, as depicted in the figures. The foot portions 20 provide a surface for the vibratory compacting machine 10 to stand on during non-use. The foot portions 20 further facilitate sliding the vibratory compacting machine 10 along flat surfaces and can help to stabilize the vibratory compacting machine 10 when in use on curved surfaces, such as piping, by creating a contact point for the ground, gravel, or the like that is surrounding the piping, at least in part. The foot portions 20 also help to catch the vibratory compacting machine 10 if it begins to slide circumferentially off of the top of a curved surface, such as a pipe, to avoid damage and difficulty in recovering the machine 10.

In preferable embodiments, including those depicted, the foot portions 20 include a lower surface with a flat, central section 40, a first end section 42 on the foot portion's 20 leading edge, and a second end section 44 on the foot portion's 20 trailing edge. The first and second end sections 42, 44 are preferably provided at an angle relative to the flat, central section 40, which allows the vibratory compacting machine 10 to glide smoothly along rough terrain and pass easily over certain low level obstructions, such as small stones and the like. The angled first and second end sections 42, 44 also assist a user in recovering control of the vibratory compacting machine 10 if it begins to tilt in or against the direction of use and facilitates easy transition between forward and backward directions of use where desired.

In some preferable embodiments, including those depicted in the figures, each of the two or more foot portions 20 also includes a vertically extending edge 22 extending upward in connection with portions of the contact plate 16. In such preferable embodiments, the vertically extending edges 22 of the foot portions 20 make up at least a portion of the arched contact surface 18 of the contact plate 16.

Preferable embodiments of the foot portions 20 further employ durability sleeves 30 covering the lower surfaces of the foot portions 20. The durability sleeves 30 help to preserve the structural integrity of the foot portions 20 and of the compacting shoes 12 more generally after numerous uses. The durability sleeves 30 are preferably made of plastic or similar hardened material, and even more preferably of an ultra-high molecular weight polyethylene material. The durability sleeves 30 also preferably have a relatively smooth bottom surface to facilitate maneuvering the vibratory compacting machine 10 with the compacting shoe 12 and durability sleeves 30 attached. The durability sleeves 30 are also preferably designed and oriented to cover the entire length of the lower surface of the foot portions 20 including the flat, central section 40 and the first and second end sections 42, 44.

Each of the two or more foot portions 20 preferably includes one or more bores or apertures sized to receive connection mechanisms, such as bolts 32, which preferably align with similarly sized bores or apertures on the respective durability sleeves 30. The durability sleeves 30 being removably attachable to the foot portions 20 ensures replacement of the durability sleeves 30 is possible without replacing the entire compacting shoe 12, providing additional versatility and longevity to the compacting shoes 12 of the present invention.

In the preferable embodiments of the present invention depicted in the figures, the contact plate 16 includes two or more bridge structures 24 that extend between the two or more foot portions 20 and are affixed to both the foot portions 20 and the connection portion 14. The two or more bridge structures 24 each preferably includes a leading and trailing edge, and in preferable embodiments such as those depicted in the figures, at least the leading edge of the front-most bridge structure 24 and the trailing edge of the rear-most bridge structure 24 includes a vertical protrusion 26 extending upwardly and away from the foot portions 20.

These vertical protrusions, as depicted in the figures, preferably extend far enough to shield the connection portion 14 of the compacting shoe 12 and some portion of the vibration system and assembly 36 as well, in preferable embodiments, from dust, dirt, and debris that is created and kicked up during operation of the vibratory compacting machine 10.

The bridge structures 24 each also preferably includes an arched lower edge 28. This arched lower edge 28 may extend from either the leading edge or trailing edge of the bridge structure 24 or from any position therebetween. The arched lower edge 28 may also extend the full length and width of the bridge structure 24, thus acting as the lower surface of the bridge structure 24, as will be understood by those of skill in the art. The arched lower edges 28 of the two or more bridge structures 24 form, at least in part, the arched contact surface 18 in preferable embodiments of the contact plate 16 employing the two or more bridge structures 24.

The compacting shoes 12 of the present invention connect to the lower end of the vibration system and assembly of the vibratory compacting machine 10. Thereby, the vibration generated by the vibration system and assembly 36 and the drive engine 46 that acts upon and operates the vibration system and assembly 36 extends into and through the attached compacting shoes 12 and upon the piping or other surface upon which the vibratory compacting machine 10 is operating, encouraging such piping or the like to settle into place before the installation process is completed.

To maneuver the vibratory compacting machine 10 during use, a first directional handle assembly 48 is preferably included, which as user can use primarily to move the vibratory compacting machine 10 in the forward direction along the designated path, typically along a length of piping where the present invention is employed. Notably, however, those of skill in the art will recognize the effectiveness of the compacting shoes 12 of the present invention to flatten and/or smooth other surfaces as well, particularly where creating an arched grade or the like is desired.

The first directional handle assembly 48 is also accompanied, in preferable embodiments of the present invention including those depicted in the figures, with a second directional handle assembly 50. The second directional handle assembly 50 is preferably located on the opposite side of the vibratory compacting machine 10 from the first directional handle assembly 48. For example, if the first directional handle assembly 48 is located and designed for use at the rear of the vibratory compacting machine 10 to encourage pushing the vibratory compacting machine 10 forward, the second directional handle assembly 50 would preferably be located and designed for use at the front of the vibratory compacting machine 10 to encourage pushing the vibratory compacting machine 10 backward.

This two-handle-assembly arrangement is of particular assistance when the vibratory compacting machine 10 is used to tamp down on laid piping, as reversing direction during the process is often desired. Further, employing first and second directional handle assemblies 48, 50 permits two or more users to assist in maneuvering the vibratory compacting machine 10 simultaneously, which is often desirable to hasten the operation of the vibratory compacting machine 10 and avoid accidents and mishaps, such as the vibratory compacting machine 10 falling off the piping to one side or the other.

The assist in comfortable operation of the vibratory compacting machine 10, each of the first and second directional handle assemblies 48, 50, and particularly the second directional handle assembly 48, are removably connected to the vibratory compacting machine 10. The connection points preferably employ noise and vibration absorbing materials to prevent injury and reduce fatigue experienced by users of the vibratory compacting machine 10. Rubber or like material is preferable, although those of skill in the art will recognize alternative materials that will serve the same purposes as well.

Figure 1:
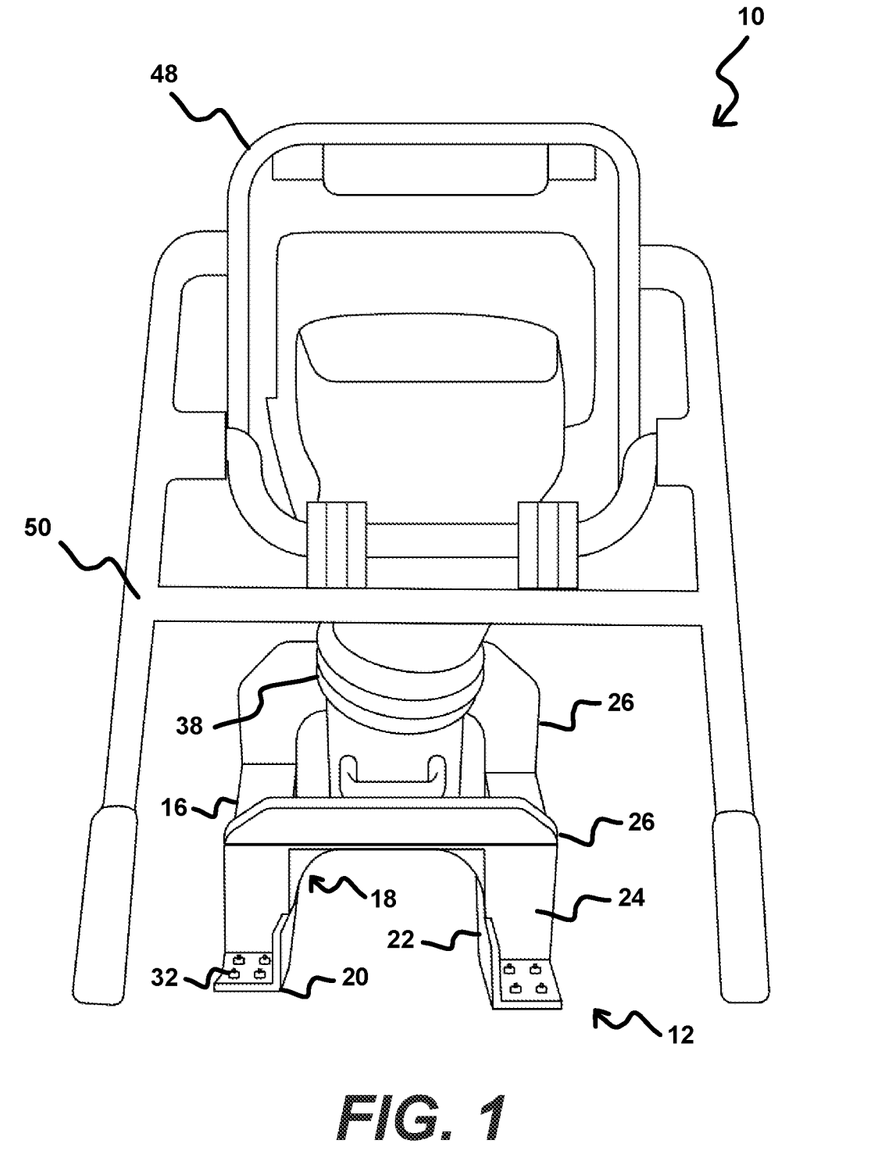
FIG. 1 depicts an elevation view from the front of a vibratory compacting machine according to preferable embodiments of the present invention.

Referring specifically now to FIG. 1, a preferable embodiment of the vibratory compacting machine 10 of the present invention is depicted. The first and second directional handle assemblies 48, 50 are prominently visible, as is the attached compacting shoe 12. As depicted, the arched contact surface 18 of the compacting shoe's 12 contact plate is sized and arranged to fit around cylindrical piping or another curved structure. The contact plate 16 is depicted with two bridge structures 24, and the vertical protrusions 26 on the leading and trailing edges of the respective bridge structures 24 are shown covering, at least in part, the connection portion 14 and the lower extreme of the vibration system and assembly 36.

The two bridge structures 24 extend between the two foot portions 20, each of which includes the vertically extending edge 22 forming a portion of the arched contact surface 18. The depicted foot portions 20 are connected to durability sleeves 30 by the several bolts 32. FIG. 1 depicts the vibratory compacting machine 10 as viewed from the front and above, so only the first end section 42 of the foot portions 20 are visible, provided at an angle relative to the flat, central section 40.

Figure 2:
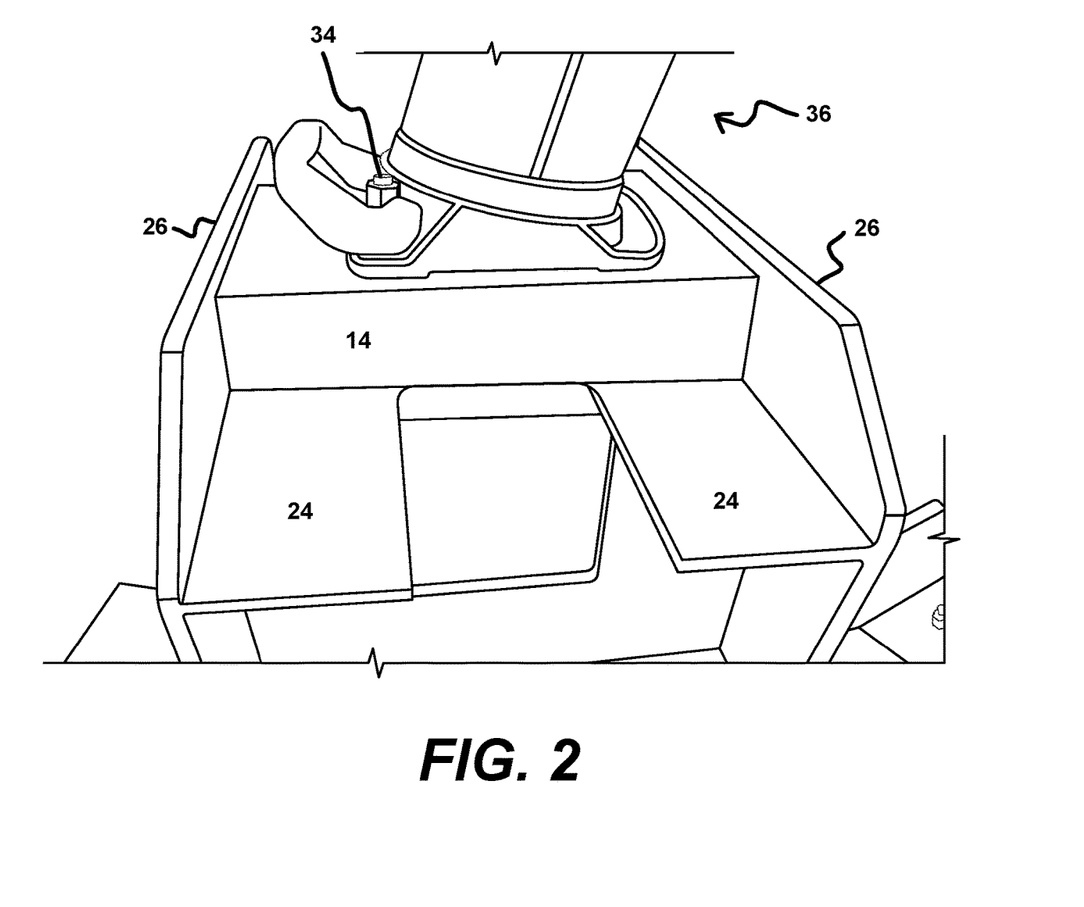
FIG. 2 depicts a close-up elevation view from the side of the connection portion of the compacting shoe according to the preferable embodiments of the present invention depicted in FIG. 1.

FIG. 2 shows a close-up view of the connection portion 14 of the compacting shoe 12 from the side and above. The connection portion 14 is shown affixed to the contact plate 16 and, specifically, to the two depicted bridge structures 24. The connection portion 14 is attached to the lower end of the vibration system and assembly 36 of the vibratory compacting machine 10 using connection means, in this instance bolt(s) 34. A handle for assisting with the attachment and removal of the compacting shoes 12 from the vibration system and assembly 36 is visible in FIG. 2.

Figure 3:
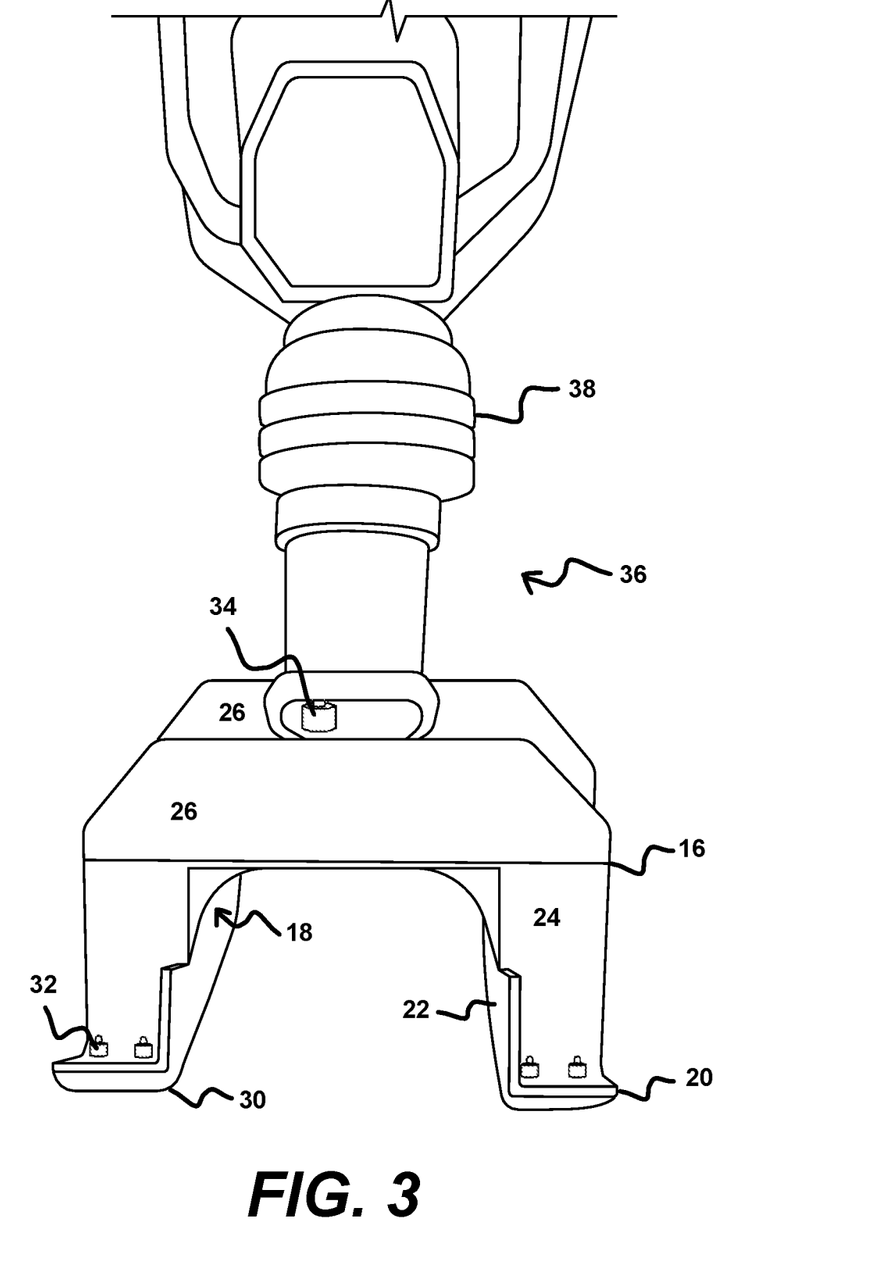
FIG. 3 depicts a partial perspective view from the rear of the lower portion of the vibratory compacting machine according to the preferable embodiments of the present invention depicted in FIGS. 1-2.

Referring next to FIG. 3, the entire lower portion of the vibratory compacting machine 10 is depicted with the compacting shoe 12 connected thereto using bolt(s) 34. The vibration system and assembly 36 is substantially encompassed by the bellows 38 in FIG. 3. The vibratory compacting machine 10 is again depicted from the front and above such that the arched contact surface 18 of the contact plate 16 is visible, as is the leading edge of the front-most of the two bridge structures 24 with its vertical protrusion 26 extending upwardly and shielding the connection portion 14 from any dirt and debris kicked up in the front of the vibratory compacting machine 10 during operation.

Figure 4:
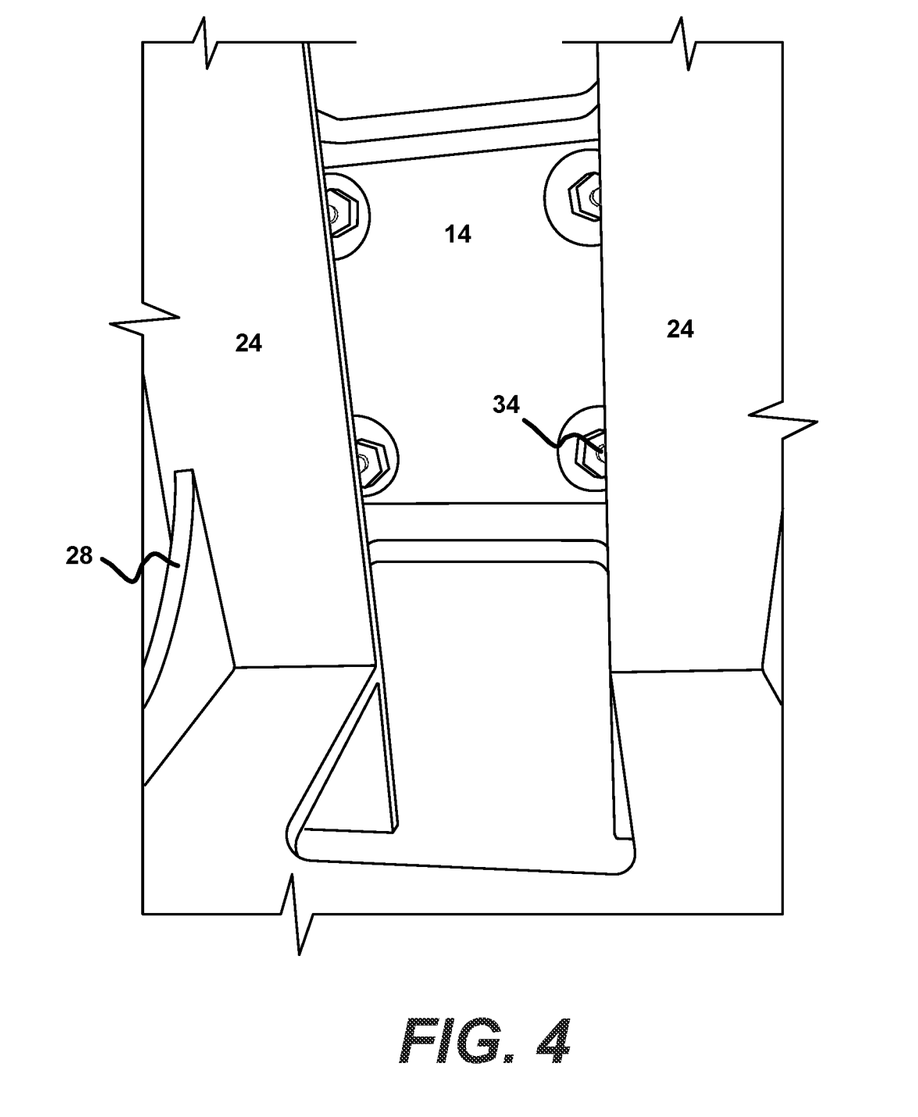
FIG. 4 depicts a close-up perspective view from below of the connection portion of the compacting shoe according to the preferable embodiments of the present invention depicted if FIGS. 1-3.

FIG. 4 again depicts a close-up view, this time from the bottom of the compacting shoe 12. Visible are portions of the two bridge structures 24 extending between foot portions 20. One portion of the arched lower edge 28 of one of the bridge structures 24 is also visible. However, FIG. 4 is primarily focused on depicted the bottom of the connection portion 14 of the compacting shoe 12, which is attached to the vibratory compacting machine's 10 vibration system and assembly 36 in this depiction by bolts 34.

Figure 5:
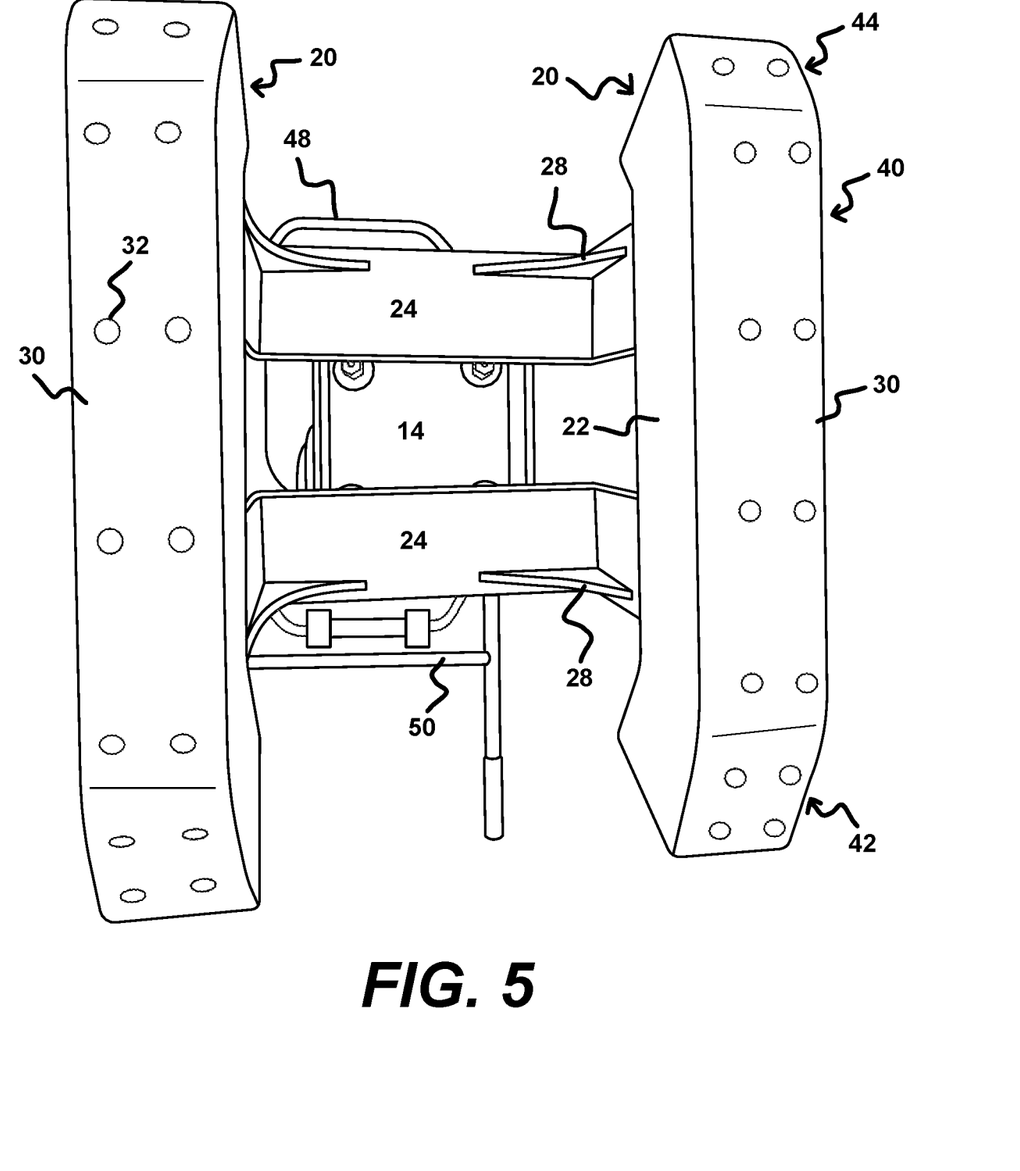
FIG. 5 depicts a perspective view from below of the vibratory compacting machine according to the preferable embodiments of the present invention depicted in FIGS. 1-4.

FIG. 5 depicts the vibratory compacting machine 10 from below, and the two foot portions 20 of the compacting shoe 12 are shown with the durability sleeves 30 attached to the lower surfaces thereof using bolts 34. In this case, to ensure a relatively smooth surface for sliding along the ground, the bolts 34 employed are carriage bolts 34. Those of skill in the art will recognize the advantages of using carriage bolts 34 for this particular application.

As depicted in FIG. 5, the two bridge structures 24 of the contact plate 16 extend between the two foot portions 20. The arched contact surface 18 of the contact plate 16 is formed in part by the vertically extending edges 22 of the foot portions 20 and in part by the arched lower edges 28 of the bridge structures 24. The bridge structures 24 are affixed to the connection portion 14, which is in turn connected to the remainder of the vibratory compacting machine 10.

Figure 6:
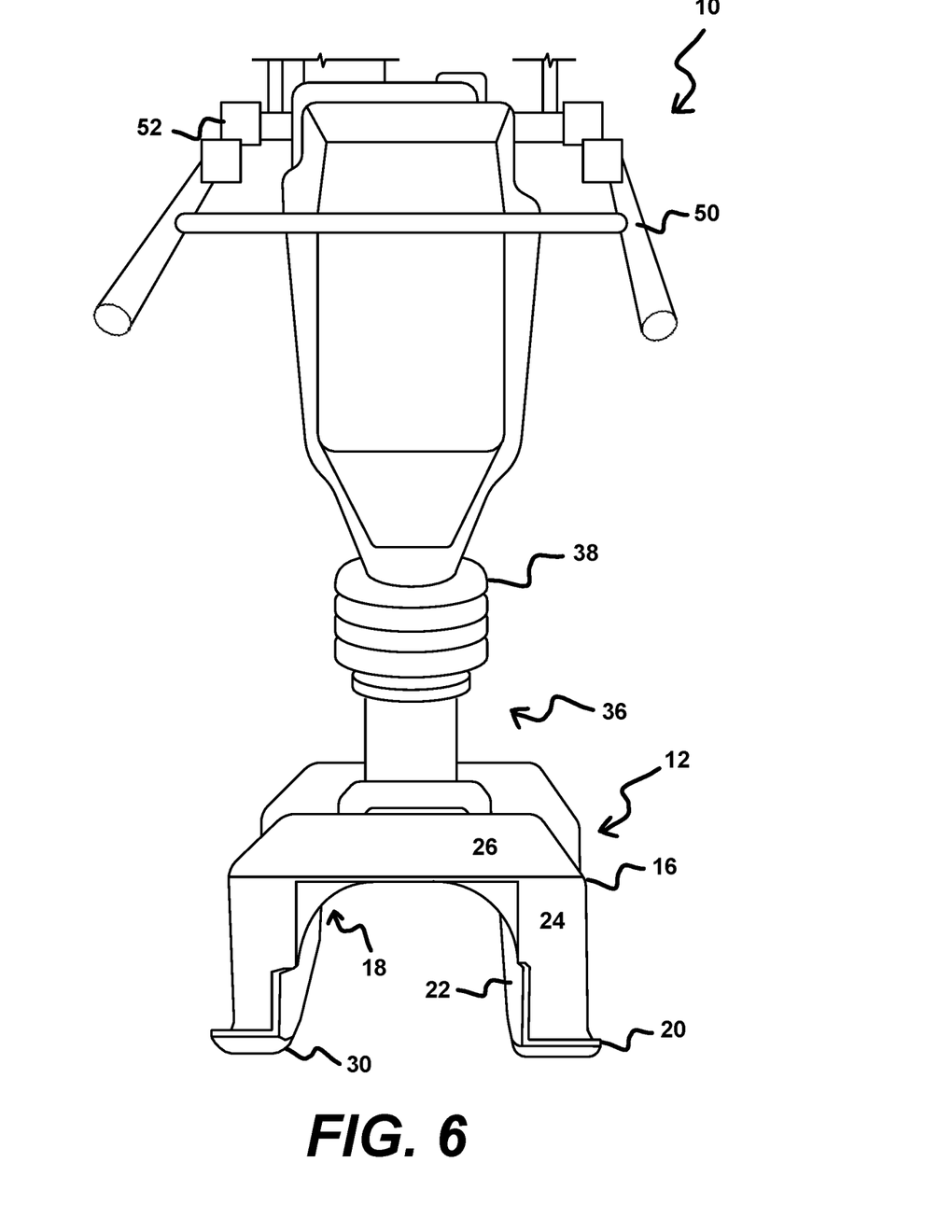
FIG. 6 depicts a perspective view from the front of the vibratory compacting machine according to the preferable embodiments of the present invention depicted in FIGS. 1-5.

Referring now to FIG. 6, a front view of the majority of the vibratory compacting machine 10 according to exemplary embodiments of the present invention is depicted. The second directional handle assembly 50 is visible with connection points 52 preferably made of rubber or another vibration and noise absorbing material. The vibration system and assembly 36 and bellows 38 are also depicted, which the lower end connected to the compacting shoe 12 of the present invention.

Figure 7:
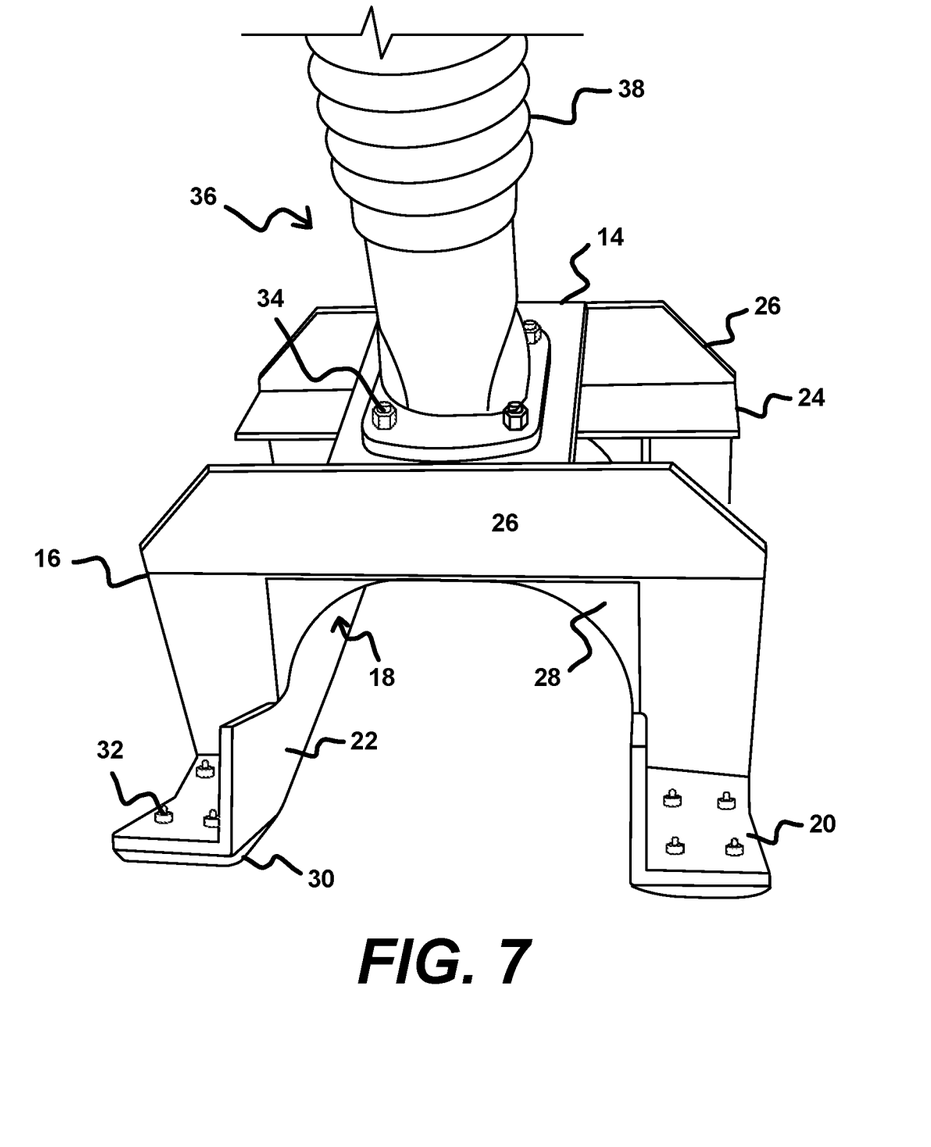
FIG. 7 depicts a partial elevation view from the front of the compacting shoe of the vibratory compacting machine according to the preferable embodiments of the present invention depicted in FIGS. 1-6.

Moving next to FIG. 7, only the lower portion of the vibratory compacting machine 10 with compacting shoe 12 is depicted, primarily from the front and above. As can be seen in FIG. 7, the connection portion 14 has an upper surface angled relative to the bridge structures 24 of the contact plate 16. As a result the top end of the vertical protrusion 26 of the leading edge of the front-most bridge structure 24 extends above the upper surface of the connection portion 14. Meanwhile, the top end of the vertical protrusion 26 of the trailing edge of the rear-most bridge structure 24 is flush with the upper surface of the connection portion 14. This angled upper surface of the connection portion 14 helps to encourage the vibratory compacting machine 10 to move forward during use, as if places the vibratory compacting machine's 10 upper features, including the first and second directional handle assemblies 48, 50 at an angle relative to the ground or other surface upon which the vibratory compacting machine 10 rests.

Figure 8:
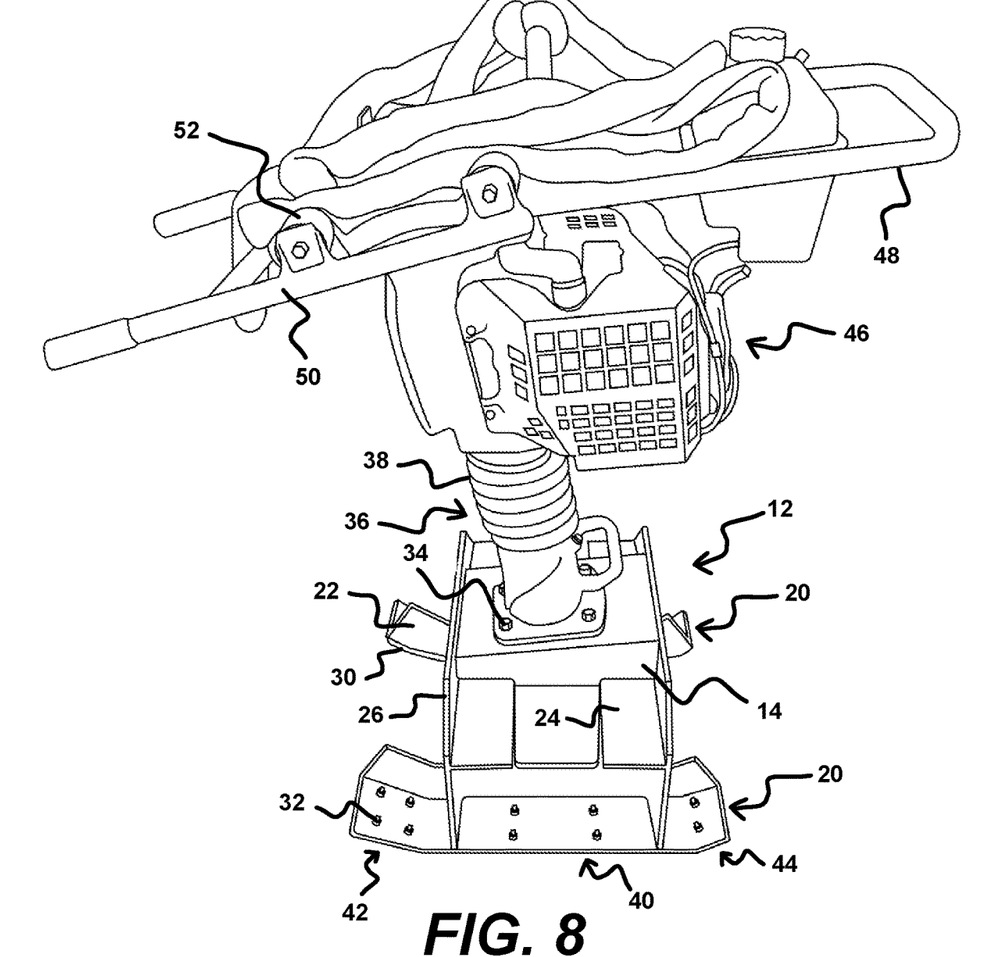
FIG. 8 depicts an elevation view from the side of the vibratory compacting machine according to the preferable embodiments of the present invention depicted in FIGS. 1-7.
Figure 9:
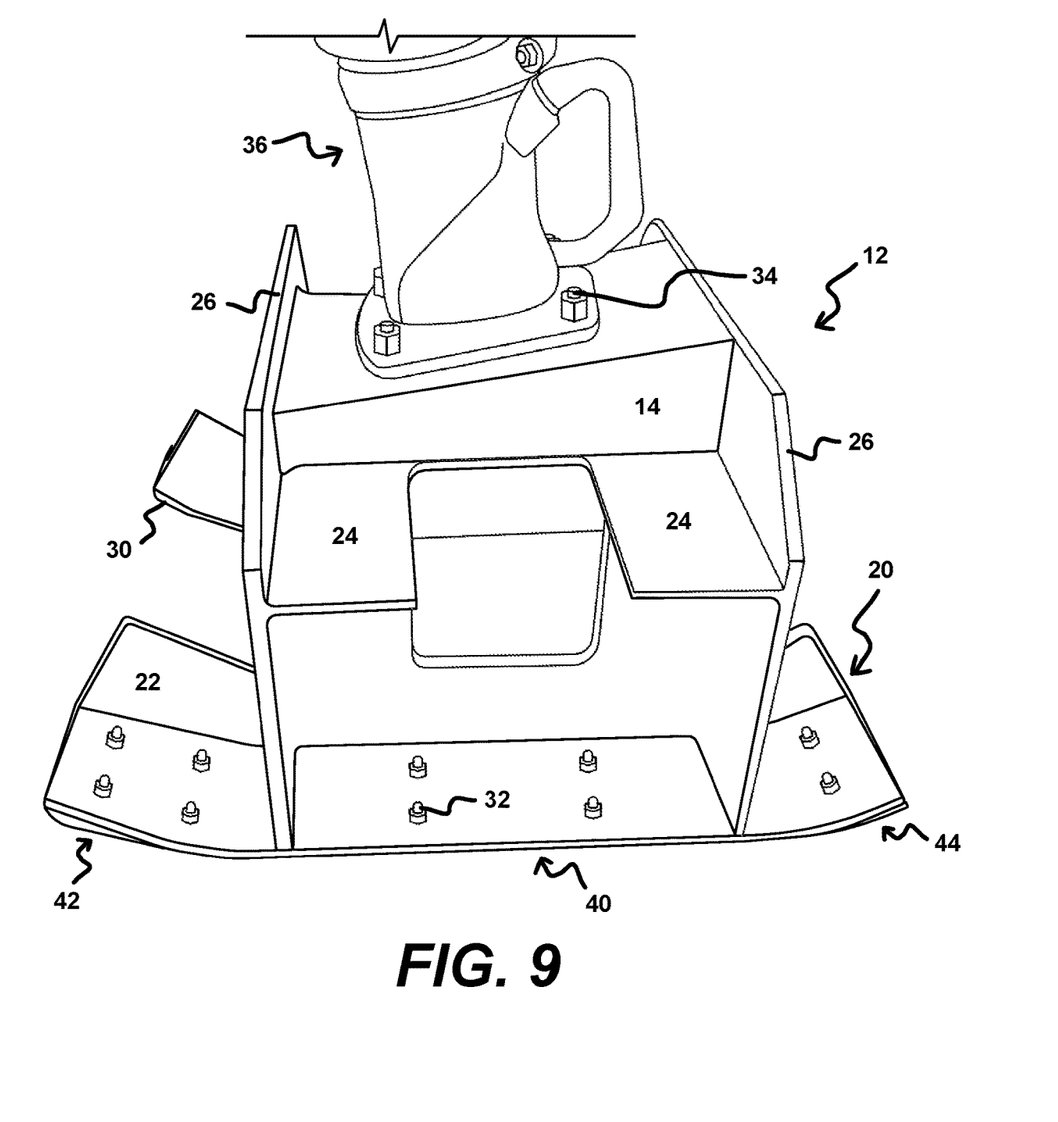
FIG. 9 depicts a partial elevation view from the side of the compacting shoe of the vibratory compacting machine according to the preferable embodiments of the present invention depicted in FIGS. 1-8.

FIGS. 8 and 9 depict the vibratory compacting machine 10 from the side and above, with FIG. 9 showing a close-up depiction of the compacting shoe in particular. The features of the upper portion of the vibratory compacting machine 10, including first and second directional handle assemblies 48, 50 and rubber connection points 52, the drive engine 46, which preferably includes fuel, oil, and air filtration, and other parts and features well known to those of skill in the art, are shown in FIG. 8. The vibration system and assembly 36 is again depicted with encompassing bellows 38 and is connected to the connection portion 14 of the compacting shoe 12 using bolts 34. The contact plate 16 and two foot portions 20 are also shown, and the flat, central section 40 and first and second end sections 42, 44 are depicted at the varying angles, helping to facilitate the smooth transition of the vibratory compacting machine 10 over rough terrain in both forward and backward directions.

Figure 10:
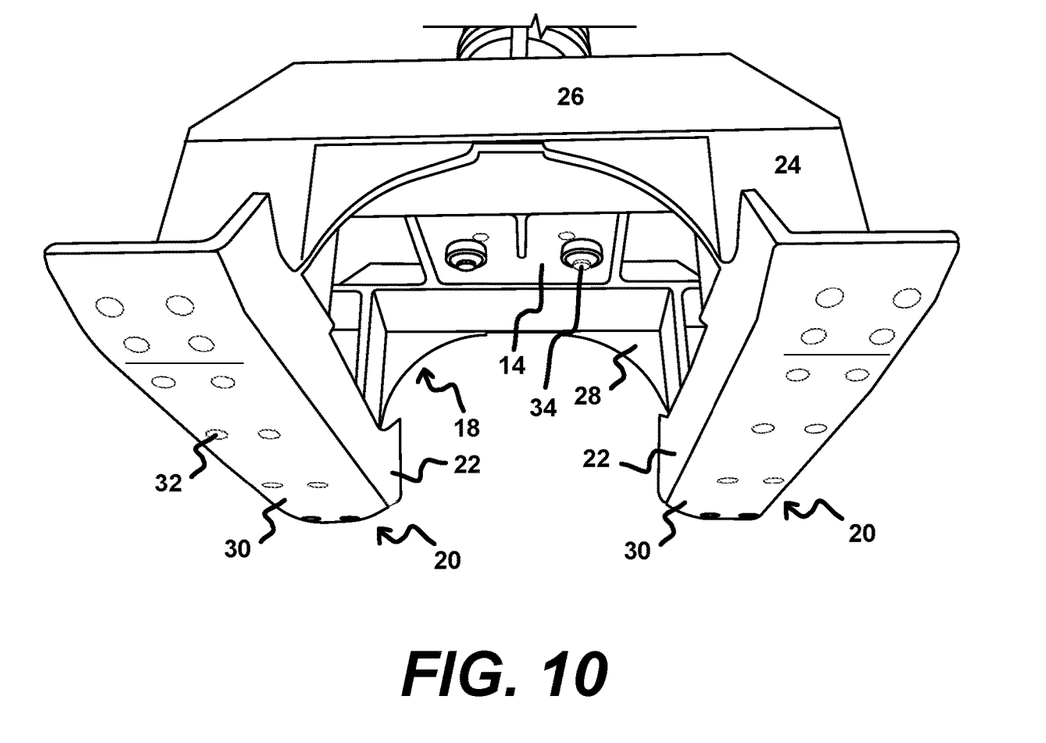
FIG. 10 depicts a partial elevation view from below of the compacting shoe of the vibratory compacting machine according to the preferable embodiments of the present invention depicted in FIGS. 1-9.

FIG. 10 shows a partial view of the vibratory compacting machine 10 from below at an angle, primarily focusing on the compacting shoe 12. The connection portion 14 is visible as well as its connection to the vibration system and assembly 36 using bolts 34. The contact plate's 16 two bridge structures 24 with vertical protrusions 26 and arched lower edges 28 are also depicted along with foot portions 20 with their vertically extending edges 22 and attached durability sleeves 30. The arched contact surface 18 is made up in parts by the arched lower edges 28 and vertically extending edges 22, forming an arched surface for running along laid piping or other curved surfaces to accomplish the objectives of the present invention.

Figure 11:
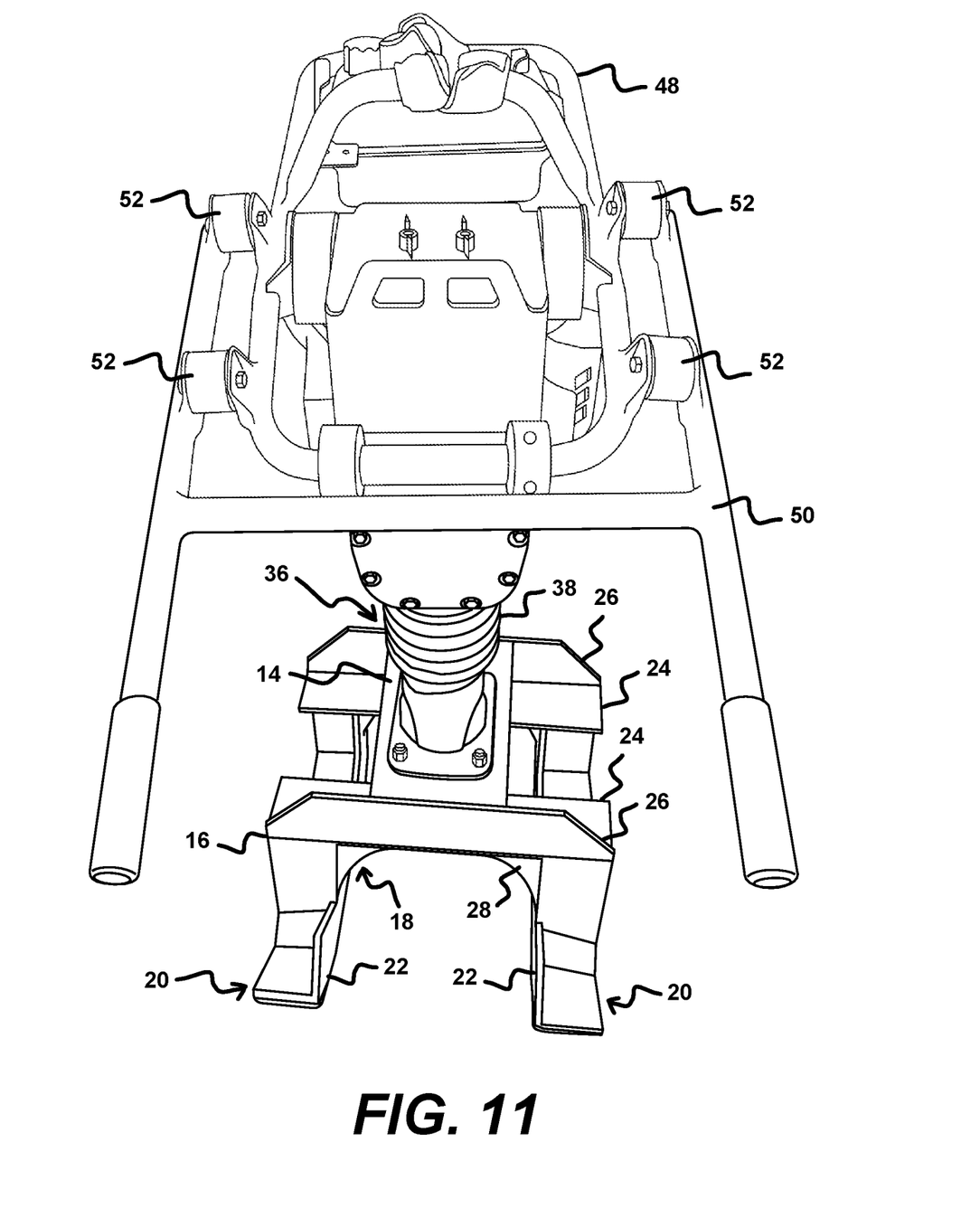
FIG. 11 depicts an elevation view from the front of the vibratory compacting machine according to the preferable embodiments of the present invention depicted in FIGS. 1-10.

Referring last to FIG. 11, a complete vibratory compacting machine 10 according to exemplary and preferable embodiments of the invention is depicted. The embodiment in FIG. 11 shows the features and components described throughout this disclosure. The depicted device accomplishes the objectives of the present invention by providing a device for encouraging laid piping to settle before it is covered and installation is completed, maneuverable in both forward and backward directions, and with the versatility to change out various sized and shaped compacting shoes 12, rendering the device usable on various sizes of piping with varying diameters and circumferences.

Certain exemplary embodiments of the present invention have been described herein in considerable detail to provide those skilled in the art with the information needed to apply the novel principles of the invention and to construct and use such exemplary and specialized components as are required. While the present invention has been described with reference to particular embodiments and arrangements of parts, features, and the like, it is not limited to these embodiments or arrangements. Indeed, modifications and variations will be ascertainable to those of skill in the art, all of which are to be understood as within the spirit and scope of the present invention.

What is claimed is:

1. A compactor shoe for use with a vibratory compacting machine, comprising:
    a connection portion comprising one or more apertures sized to receive one or more bolts;
    a contact plate affixed to the connection portion, the contact plate comprising an arched contact surface sized and shaped to fit reasonably snugly around at least a portion of a pipe having a substantially cylindrical shape and a substantially circular cross-section;
    two or more foot portions affixed to the contact plate, each of the two or more foot portions comprising a flat central section and first and second end sections provided at an angle relative to the flat central section; and
    the contact plate further comprising two or more bridge structures extending between the two or more foot portions, each of the two or more bridge structures comprising an arched lower edge forming at least a portion of the arched contact surface;
    the compactor shoe being removably attachable to a vibration system of the vibratory compacting machine.

2. The compactor shoe of claim 1, wherein each of the two or more foot portions further comprises a durability sleeve removably attachable to a bottom surface of each foot portion, the durability sleeve comprising an ultra-high molecular weight polyethylene material.

3. The compactor shoe of claim 2, wherein each of the foot portions and each of the durability sleeves further comprises one or more bores sized to receive one or more bolts for attaching the durability sleeves to the two or more foot portions.

4. The compactor shoe of claim 1, wherein each of the foot portions comprises a bottom surface and at least one vertically extending edge extending upwardly therefrom, the vertically extending edge forming at least a portion of the arched contact surface of the contact plate.

5. The compactor shoe of claim 1, wherein:
    a front-most of the two or more bridge structures comprises a leading surface, the leading surface comprising a substantially flat, vertical protrusion extending upward and away from the arched lower edge; and
    a rear-most of the two or more bridge structures comprises a trailing surface, the trailing surface comprising a substantially flat, vertical protrusion extending upward and away from the arched lower edge.

6. The compactor shoe of claim 5, wherein the substantially flat, vertical protrusions of the leading surface and the trailing surface each extends vertically above the connection portion, shielding the connection portion from debris when the compactor shoe is connected to the vibratory compacting machine and the vibratory compacting machine is in use.

7. A vibratory compacting machine comprising the compactor shoe of claim 1.

8. The vibratory compacting machine of claim 7 further comprising a first handle composition and a second handle composition, the first handle composition being located and oriented to facilitate operation of the vibratory compacting machine in a first direction, the second handle composition being located and oriented to facilitate operation of the vibratory compacting machine in a second direction substantially opposite to the first direction.

9. The vibratory compacting machine of claim 8, wherein at least one of the first handle composition and the second handle composition comprises two or more mounting points, the two or more mounting points comprising a noise and vibration absorbing material.

10. A vibratory compacting machine comprising:
a drive engine;
an encapsulated vibration system mechanically connected to the drive engine;
one or more compacting shoes removably attachable to the encapsulated vibration system, each of the one or more compacting shoes comprising:
a connection portion comprising one or more apertures sized to receive one or more bolts to attach the compacting shoe with the encapsulated vibration system;
a contact plate affixed to the connection plate, the contact plate comprising an arched contact surface sized and shaped to fit reasonably snugly around at least a portion of a pipe having a substantially cylindrical shape and a substantially circular cross-section; and
two or more foot portions affixed to the contact plate, each of the two or more foot portions comprising a flat central section and first and second end sections provided at an angle relative to the flat central section; and
a first handle composition and a second handle composition, the first handle composition being located and oriented to facilitate operation of the vibratory compacting machine in a first direction, the second handle composition being located and oriented to facilitate operation of the vibratory compacting machine in a second direction substantially opposite to the first direction.

11. The vibratory compacting machine of claim 10, wherein each of the two or more foot portions of each of the one or more compacting shoes further comprises a durability sleeve removably attachable to a bottom surface of each foot portion, the durability sleeve comprising an ultra-high molecular weight polyethylene material.

12. The vibratory compacting machine of claim 11, wherein each of the foot portions and each of the durability sleeves further comprises one or more bores sized to receive one or more bolts for attaching the durability sleeves to the two or more foot portions.

13. The vibratory compacting machine of claim 10, wherein each of the foot portions of each of the one or more compacting shoes comprises a bottom surface and at least one vertically extending edge extending upwardly therefrom, the vertically extending edge forming at least a portion of the arched contact surface of the contact plate of the one or more compacting shoes.

14. The vibratory compacting machine of claim 10, wherein the contact plate of each of the one or more compacting shoes comprises two or more bridge structures extending between the two or more foot portions, each of the two or more bridge structures comprising an arched lower edge forming at least a portion of the arched contact surface of the contact plate.

15. The vibratory compacting machine of claim 14, wherein:
a front-most of the two or more bridge structures comprises a leading surface, the leading surface comprising a substantially flat, vertical protrusion extending upward and away from the arched lower edge; and
a rear-most of the two or more bridge structures comprises a trailing surface, the trailing surface comprising a substantially flat, vertical protrusion extending upward and away from the arched lower edge.

16. The vibratory compacting machine of claim 15, wherein the substantially flat, vertical protrusions of the leading surface and the trailing surface each extends vertically above the connection portion, shielding the connection between the connection portion and the encapsulated vibration system from debris when the vibratory compacting machine is in use.

17. The vibratory compacting machine of claim 16, wherein the connection portion of each of the one or more compacting shoes comprises a lower surface and an upper surface, the upper surface being angled relative to the lower surface such that the vibratory compacting machine is situated at an angle relative to the flat central sections of the two or more foot portions of the compacting shoe during use.

18. The vibratory compacting machine of claim 10, wherein the one or more compacting shoes comprises at least three compacting shoes, each sized and shaped to fit reasonably snugly around a different sized pipe having a substantially cylindrical shape and a substantially circular cross-section, a first of the three compacting shoes is sized and shaped to fit reasonably snugly around a pipe with an outer diameter of approximately 168 millimeters, a second of the three compacting shoes is sized and shaped to fit reasonably snugly around a pipe with an outer diameter of approximately 324 millimeters, and a third of the three compacting shoes is sized and shaped to fit reasonably snugly around a pipe with an outer diameter of approximately 406 millimeters.

19. The vibratory compacting machine of claim 10, wherein at least one of the first handle composition and the second handle composition comprises two or more mounting points, the two or more mounting points comprising a rubber material effective at noise and vibration absorption.

* * * * *